US008438389B2

(12) United States Patent
Yao et al.

(10) Patent No.: US 8,438,389 B2
(45) Date of Patent: May 7, 2013

(54) METHOD AND SYSTEM FOR DYNAMIC SERVICE NEGOTIATION WITH A UNIFORM SECURITY CONTROL PLANE IN A WIRELESS NETWORK

(75) Inventors: Zongming Sinbada Yao, Shanghai (CN); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 12/542,244

(22) Filed: Aug. 17, 2009

(65) Prior Publication Data

US 2011/0040969 A1 Feb. 17, 2011

(51) Int. Cl.
*H04L 29/06* (2006.01)

(52) U.S. Cl.
USPC ........ 713/168; 726/1; 726/3; 726/6; 370/473; 370/493

(58) Field of Classification Search .................. 713/168; 370/331, 328, 342, 428
See application file for complete search history.

(56) References Cited

U.S. PATENT DOCUMENTS

| 7,885,602 | B1 * | 2/2011 | Kelsey et al. ................. 455/41.2 |
| 7,924,805 | B2 * | 4/2011 | Nishibayashi et al. ....... 370/346 |
| 2003/0002456 | A1 * | 1/2003 | Soomro et al. ................. 370/328 |
| 2006/0165103 | A1 * | 7/2006 | Trudeau et al. ............... 370/401 |
| 2007/0206527 | A1 * | 9/2007 | Lo et al. ......................... 370/328 |
| 2008/0049703 | A1 * | 2/2008 | Kneckt et al. ................. 370/342 |
| 2009/0141685 | A1 * | 6/2009 | Berglund ....................... 370/331 |

OTHER PUBLICATIONS

International Search Report and Written Opinion for International Patent Application No. PCT/US2010/043193, Mailed Feb. 21, 2011, 11 pages.
IEEE Computer Society, Part 11: Wireless LAN Medium Access Control (MAC) and Physical Layer (PHY) Specifications, IEEE Standard for Information technology—Telecommunications and information exchange between systems—Local and metropolitan area networks—Specific requirements, Jun. 12, 2007, 1232 pages, IEEE Std 802.11-2007, IEEE, New York, NY.
IEEE Computer Society, Part 15.1: Wireless medium access control (MAC) and physical layer (PHY) specifications for wireless personal area networks (WPANs), IEEE Standard for Information technology—Telecommunications and information exchange between systems—Local and metropolitan area networks—Specific requirements, Jun. 14, 2005, 598 pages, IEEE Std 802.15.1-2005, IEEE, New York, NY.

(Continued)

*Primary Examiner* — Jung Kim
*Assistant Examiner* — Tri Tran
(74) *Attorney, Agent, or Firm* — Schwabe, Williamson & Wyatt, P.C.

(57) ABSTRACT

A method and system to facilitate dynamic service negotiation with a uniform and persistent security control plane in a wireless network. In one embodiment of the invention, a node in the wireless network determines each capability provided by each of one or more virtual nodes that it supports and transmits a frame that has information of each capability provided by each of the one or more virtual nodes. By combining all the information of each capability provided by each of the one or more virtual nodes into one frame, the node reduces the volume of management traffic required and increases the available usable channel bandwidth in one embodiment of the invention.

15 Claims, 6 Drawing Sheets

OTHER PUBLICATIONS

IEEE Computer Society, Part 16: Air Interface for Fixed Broadband Wireless Access Systems, IEEE Standard for Local and metropolitan area networks, Oct. 1, 2004, 894 pages, IEEE Std 802.16-2004, IEEE, New York, NY.

IEEE Computer Society, Part 21: Media Independent Handover Services, IEEE Standard for Local and metropolitan area networks, Jan. 21, 2009, 320 pages, IEEE Std 802.21-2008, IEEE, New York, NY.

International Preliminary Report on Patentability mailed Mar. 1, 2012 in International Application No. PCT/US2010/043193.

* cited by examiner

METHOD AND SYSTEM FOR DYNAMIC SERVICE NEGOTIATION WITH A UNIFORM SECURITY CONTROL PLANE IN A WIRELESS NETWORK

FIELD OF THE INVENTION

This invention relates to a wireless network, and more specifically but not exclusively, to facilitate dynamic service negotiation with a uniform and persistent security control plane in a wireless network.

BACKGROUND DESCRIPTION

In a wireless network, an access point typically advertises its identity and capabilities to other stations using beacon management frames. FIG. 1A illustrates a prior art wireless network 100. The station 120 receives beacon/probe response management frames 112 and 132 from the access point A 110 and the access point B 130 respectively. The beacon/probe response management frames 112 and 132 contain information such as the channel, the basic service set identifier, the supported data rate, and the security protocol, of the access points 110 and 130 respectively.

An access point can also support one or more virtual access points that appear to a station as independent physical access points. FIG. 1B illustrates a prior art wireless network 150 with an access point A 110 that supports one virtual access point. The access point A 110 supports a logical entity that appears to the station 120 as an access point B even though the access point B does not exist physically. The access point A 110 creates a unique service set identifier (SSID) for the virtual access point B and sends a beacon/probe management frame 132 for the virtual access point B during each beacon interval.

For example, during each beacon interval T, the access point A 110 sends a beacon frame 112 with its own information and another beacon frame 132 with information of the virtual access point B. The station 120 is aware of two access points when it receives the beacon/probe request management frames 112 and 132, even though only one physical access point A 110 is present.

As the number of virtual access points increases, the volume of management traffic in the wireless network 150 increases and it reduces the usable available channel bandwidth. This is because when a virtual access point is added to the wireless network 150, the access point supporting the virtual access point is required to send an additional beacon/probe response management frame for the virtual access point. The problem of excessive management traffic and interference exacerbates when there are more physical access points that support multiple virtual access points in the wireless network 150. It may also decrease the number of admissible stations in the wireless network.

When the station 120 desires a different service profile from the access point A 110, it is required to manually disconnect and re-connect to a different SSID for each service profile that it desires and a new security configuration for each service profile may be required. The switching of service profiles may also affect the quality of service of the communication between the station 120 and the access point A 110.

BRIEF DESCRIPTION OF THE DRAWINGS

The features and advantages of embodiments of the invention will become apparent from the following detailed description of the subject matter in which.

DETAILED DESCRIPTION

Figure 1A:
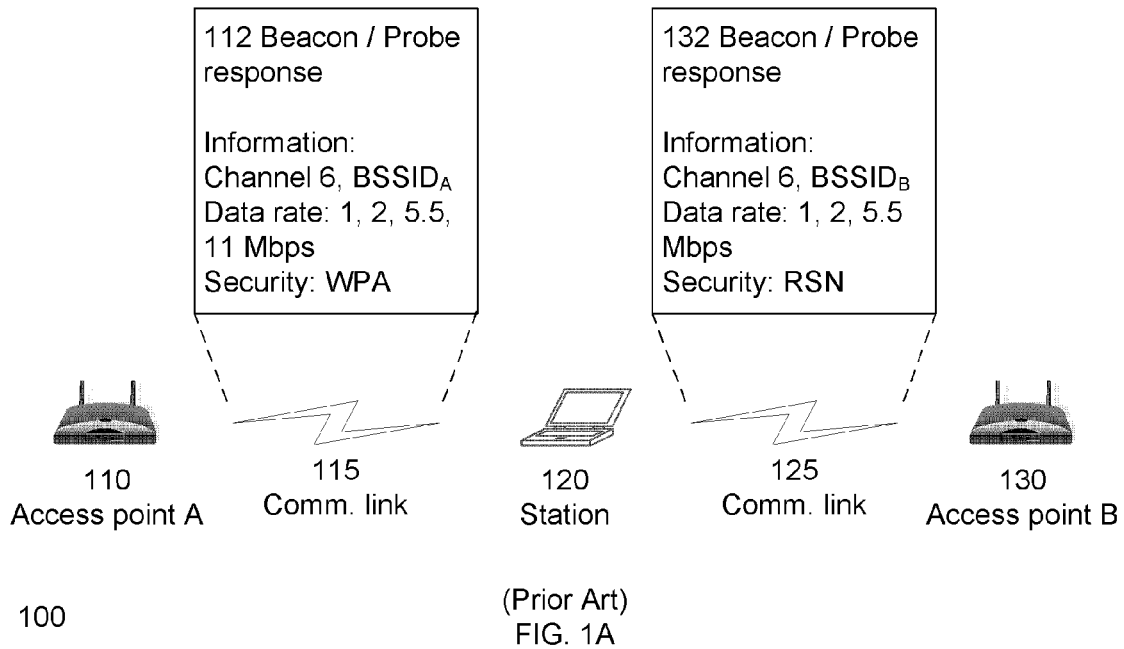
FIG. 1A illustrates a prior art wireless network.
Figure 1B:
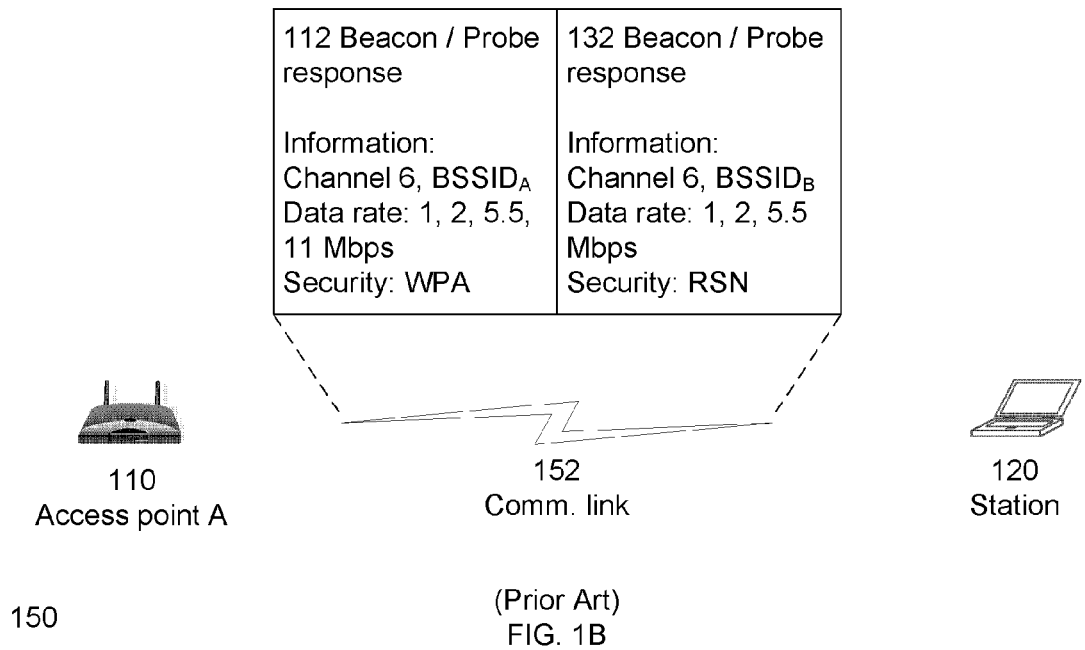
FIG. 1B illustrates a prior art wireless network with an access point A that supports one virtual access point.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system to facilitate dynamic service negotiation with a uniform and persistent security control plane in a wireless network. In one embodiment of the invention, a node in a wireless network determines each capability provided by each of one or more virtual nodes that it supports and transmits a frame that has information of each capability provided by each of the one or more virtual nodes. By combining all the information of each capability provided by each of the one or more virtual nodes into one frame, the node reduces the volume of management traffic required and increases the available usable channel bandwidth in one embodiment of the invention.

At each beacon interval, the node sends only one beacon management frame that has the information of all the virtual nodes that it supports in one embodiment of the invention. Similarly, when the node receives a probe request management frame, the node sends only one probe response management frame that has the information of all the virtual nodes that it supports in one embodiment of the invention. The node includes, but is not limited to, an access point, a base station, an evolved node B (eNodeB), a mobile station (MS), a subscriber station (SS), an user equipment (UE) and the like. The wireless network operates in accordance with, but is not limited to, the Institute of Electrical and Electronics Engineers (IEEE) 802.11 standard ("IEEE standard 802.11-2007, published Jun. 12, 2007") and its related family, IEEE 802.15 standard ("IEEE standard 802.15.1-2005, published Jun. 14, 2005") and its related family, IEEE 802.16 standard ("IEEE standard 802.16-2004, published Oct. 1, 2004") and its related family, 3rd Generation Partnership Project (3GPP) Long Term Evolution (LTE) standard, and the like.

Figure 2:
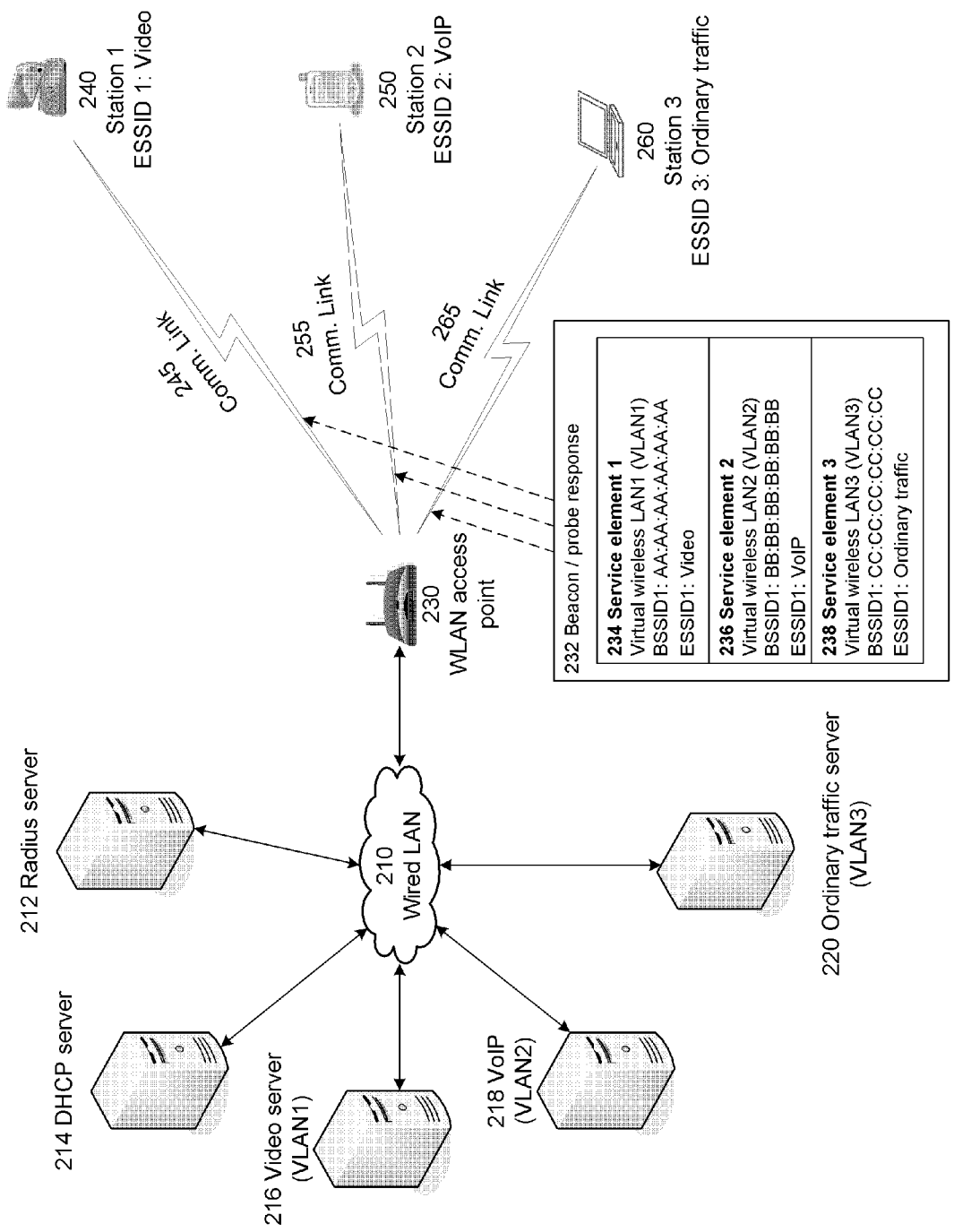
FIG. 2 illustrates a network in accordance with one embodiment of the invention.

FIG. 2 illustrates a network 200 in accordance with one embodiment of the invention. The network 200 has a wireless local area network (WLAN) access point (AP) 230 that couples to the stations 240, 250 and 260 via the wireless communication links 245, 255 and 265 respectively. The WLAN AP 230 is connected to a wired LAN 210 that has a radius server 212, a dynamic host configuration protocol (DHCP) server 214, a video server 216, a Voice over Internet Protocol (VoIP) server 218, an ordinary traffic server 220. The wired LAN 210 facilitates incoming and outgoing data traffic from the WLAN AP 230 to the radius server 212, the DHCP server 214, the video server 216, the VoIP server 218, and the ordinary traffic server 220.

In one embodiment of the invention, the WLAN AP 230 creates a virtual access point for each of the video server 216, the VoIP server 218, and the ordinary traffic server 220. The virtual access points created by the WLAN AP 230 support virtual LAN 1 (VLAN1), VLAN2 and VLAN3 for the video server 216, the VoIP server 218, and the ordinary traffic server 220 respectively. For each virtual access point that the WLAN AP 230 supports, the WLAN AP 230 creates a unique basic service set identifier (BBSID) and a unique extended service set identifier (ESSID). The unique BSSID and unique ESSID of each VLAN allow the WLAN AP 230 to manage incoming and outgoing data traffic to the various VLANs.

In one embodiment of the invention, the WLAN AP 230 creates a service element for the VLAN of each virtual access point. The service element of each VLAN has information that includes, but is not limited to, a BSSID, an ESSID, a service type or profile, and a channel, of the VLAN. During each beacon interval, the WLAN AP 230 sends or broadcasts a beacon management frame 232 that includes, but is not limited to, identification information, security protocol information, the service elements of each VLAN supported by the WLAN AP 230 and the like. The beacon management frame 232 has three service elements 234, 236, and 238 that have information of the VLAN1, VLAN2 and VLAN3 respectively. In one embodiment of the invention, the WLAN AP 230 sends only one probe response frame 232 in response to receiving a probe request management frame from the stations 240, 250, and 260.

By sending only one beacon management frame 232 per beacon interval, the WLAN AP 230 reduces the management traffic of the wireless network and therefore increases the available usable channel bandwidth. For example, if the WLAN AP 230 supports N virtual access points and the average size of each beacon management frame is 100 bytes, by sending only one beacon management frame 232, the WLAN AP 230 reduces the management traffic by approximately [100*(N−1)] bytes. In addition, each beacon management frame is sent at the lowest supported data rates and the advantage of reducing the number of beacon management frames greatly improves the available channel capacity.

When the station 1 240 receives the beacon/probe response management frame 232 from the WLAN AP 230, it checks the service elements 234, 236, and 238 to determine the services provided by the WLAN AP 230. In one embodiment of the invention, the station 1 240 stores the service elements 234, 236, and 238. The identification information in the beacon/probe response management frame 232 from the WLAN AP 230 includes, but is not limited to, a BSSID, and a SSID, of the WLAN AP 230. When the station 1 240 determines that the WLAN AP 230 supports the service that it desires or requires, the station 1 240 associates or re-associates with the WLAN AP 230 using the identification information in the beacon/probe response management frame 232 and establishes a wireless communication link 245.

In one embodiment of the invention, the WLAN AP 230 and the station 1 240 establish an uniform or common security control plane using at least in part, the identification information, to facilitate operation of the one or more supported services by the WLAN AP 230. In one embodiment of the invention, the station 1 240 uses common security information that includes, but is not limited to, security credentials, cryptographic protocol, authentication protocol and the like, for all the services provided by the WLAN AP 230. This allows the WLAN AP 230 to manage the stations easily as there is a common security control plane.

In one embodiment of the invention, the WLAN AP 230 and the station 1 240 use IEEE 802.11 Robust Security Network Association (RSNA) authentication protocol as the common security control plane. In another embodiment of the invention, the WLAN AP 230 and the station 1 240 use IEEE 802.16 RSNA authentication protocol as the common security control plane. The WLAN AP 230 and the station 1 240 use one or more session keys derived from the IEEE 802.11 RSNA authentication protocol or the IEEE 802.16 RSNA authentication protocol to protect the communication between the WLAN AP 230 and the station 1 240. One of ordinary skill in the relevant art will readily appreciate that other authentication protocol(s) may be used without affecting the workings of the invention.

The station 1 240 is able to inter-change or switch the service type or profile that it requires from the WLAN AP 230 while maintaining the same connection or association with the WLAN AP 230 in one embodiment of the invention. For example, in one embodiment of the invention, the station 1 240 is able to dynamically switch to any one of the video, VoIP and ordinary traffic service provided by the WLAN AP 230 while maintaining the same secure communication link 245. In another embodiment of the invention, the station 1 240 is able to support multiple services provided by the WLAN AP 230 concurrently. By allowing the station 1 240 to dynamically inter-change the service type it needs while maintaining the connection with the WLAN AP 230 through a common security control plane, the quality of service of the wireless data traffic can be enhanced in one embodiment of the invention.

The station 2 250 and the station 3 260 show that more than one station can be connected with the WLAN AP 230. The workings of the stations 250 and 260 are similar to station 1 240 and it shall not be repeated herein. The network 200 illustrated in FIG. 2 is not meant to be limiting. In another embodiment of the invention, more than one WLAN AP is present in the network 200. In another embodiment of the invention, the functionality of the WLAN AP 230 may also be implemented by a station with access point functionality.

Figure 3:
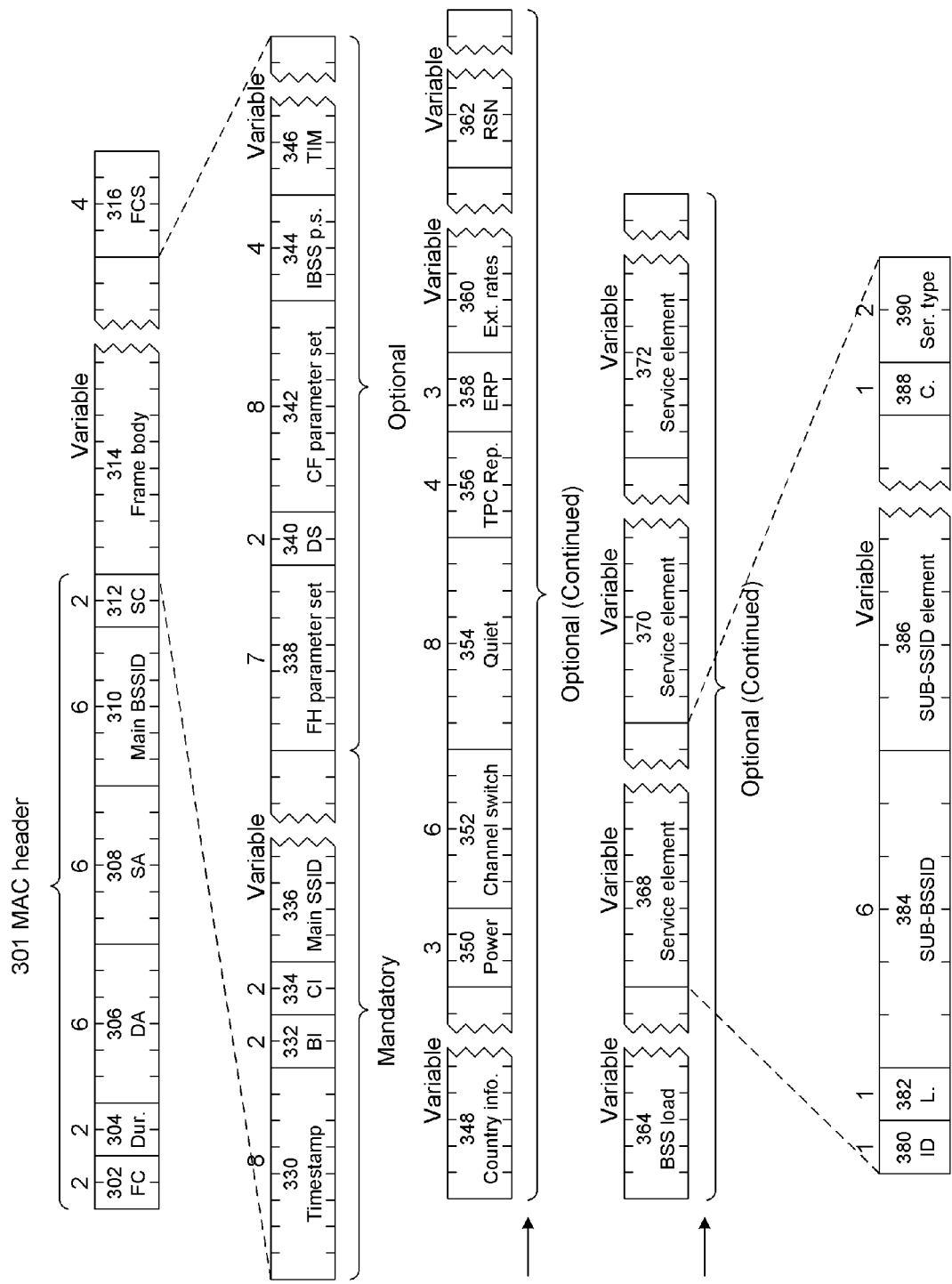
FIG. 3 illustrates a beacon management frame in accordance with one embodiment of the invention.

FIG. 3 illustrates a beacon management frame 300 in accordance with one embodiment of the invention. For clarity of illustration, FIG. 3 is discussed with reference to FIG. 2. The beacon management frame 300 is compliant at least in part, with the IEEE 802.11 standard in one embodiment of the invention. Although the beacon management frame 300 is described with reference to the IEEE 802.11 standard, it is not meant to be limiting. One of ordinary skill in the relevant art will readily appreciate how to implement the methods disclosed herein in other wireless standards without affecting the workings of the invention.

The beacon management frame 300 has three main parts that includes the enhanced medium access control (MAC) header field 301, the frame body field 314 and the frame check sequence (FCS) field 316. The MAC header field 301 has a frame control (FC) field 302 of 2 octets, a duration/identification (ID) field 304 of 2 octets, a destination address (DA) field 306 of 6 octets, a source address (SA) field 308 of 6 octets, a main BSSID field 310 of 6 octets, and a sequence control (SC) field 312 of 2 octets. The FC 302 field has a type field and a subfield that indicate the function and type of the frame. The FC 302 field indicates that the frame is a beacon management frame or a probe response management frame by a unique setting of the type and subtype fields. In one embodiment of the invention, the SA 308 field and the main BSSID 310 field contains the MAC address of the WLAN AP 230.

The frame body field 314 has a variable size that may be dependent on the maximum size of the MAC service data unit (MSDU) and overheads from any security encapsulation. The frame body field 314 has mandatory fields and optional fields. The mandatory fields of the frame body field 314 include, but is not limited to, the timestamp field 330 of 8 octets, the beacon interval (BI) field 332 of 2 octets, the capability information (CI) field 334 of 2 octets and the main SSID field 336 of variable size and the supported rates field (not shown in FIG. 3). In one embodiment of the invention, the main BSSID field 310 and the main SSID field 336 allow the stations 240, 250, and 260 to authenticate and associate/re-associate with the WLAN AP 230. This allows a uniform and persistent security control plane for the WLAN AP 230, regardless of the services that stations 240, 250, and 260 desire to access or use. Managing different security credentials for the different virtual APs is unsecure and it complicates security administration.

The optional fields of the frame body field 314 include, but is not limited to, the frequency-hopping (FH) parameter set field 338 of 7 octets, the distribution system (DS) parameter set field 340 of 2 octets, a contention free (CF) parameter set field 342 of 8 octets, an independent (IBSS) parameter set field 344 of 4 octets, a traffic indication map (TIM) field 346 of variable size, a country information field 348 of variable size, a power constraint field 350 of 3 octets, a channel switch announcement field 352 of 6 octets, a quiet field 354 of 8 octets, a transmit power control (TPC) report field 356 of 4 octets, a extended rate physical layer (PHY) (ERP) field 358 of 3 octets, an extended supported rates field 360 of variable size, a robust security network (RSN) field 362 of variable size, a BSS load field 364 of variable size and service elements 368, 370, and 372. In another embodiment of the invention, the beacon management frame 300 has more than or less than three service elements.

When the stations 240, 250, and 260 receive the beacon management frame 300, the service elements 368, 370, and 372 are checked to determine the services provided by the WLAN AP 230. Instead of sending out different beacon or probe response management frames for different multi-radio virtual AP services, a single beacon management frame 300 incorporates a common security advertisement and all multiple virtual AP services.

In another embodiment of the invention, one or more parts of the frame body 314 of the beacon management frame 314 can be applied to a probe response management frame. One of ordinary skill in the relevant art will readily appreciate how to apply the methods disclosed herein for the beacon management frame 300 to a probe response management frame and the probe response management frame shall not be described herein.

Each of the service elements 368, 370, and 372 has subfields including, but not limited to, an identification (ID) field 380 of 1 octet, a length field 382 of 1 octet, a sub-BSSID field 384 of 6 octets, a sub-SSID element field 386 of variable size, a channel field 388 of 1 octet, and a service type field 390 of 2 octets. In one embodiment of the invention, the stations 240, 250, and 260 are able to use the same security profile but select different services offered by the WLAN AP 230. The service type field 390 indicates to the stations 240, 250, and 260, the services offered by the WLAN AP 230. The services include, but are not limited to, VoIP, Video, Multicast Video, Peer-to-Peer, Internet, services and the like. The sub-BSSID field 384 and the sub-SSID element field 386 are used to represent the unique virtual AP supported by the WLAN AP 230. When the stations 240, 250, and 260 determine that it requires a particular service of a particular virtual AP, it can send and receive service-specific traffic via the particular virtual AP. In addition, the stations and the particular virtual AP can also negotiate specific Quality of Service (QoS) and power-save options for each particular service in one embodiment of the invention.

Figure 4:
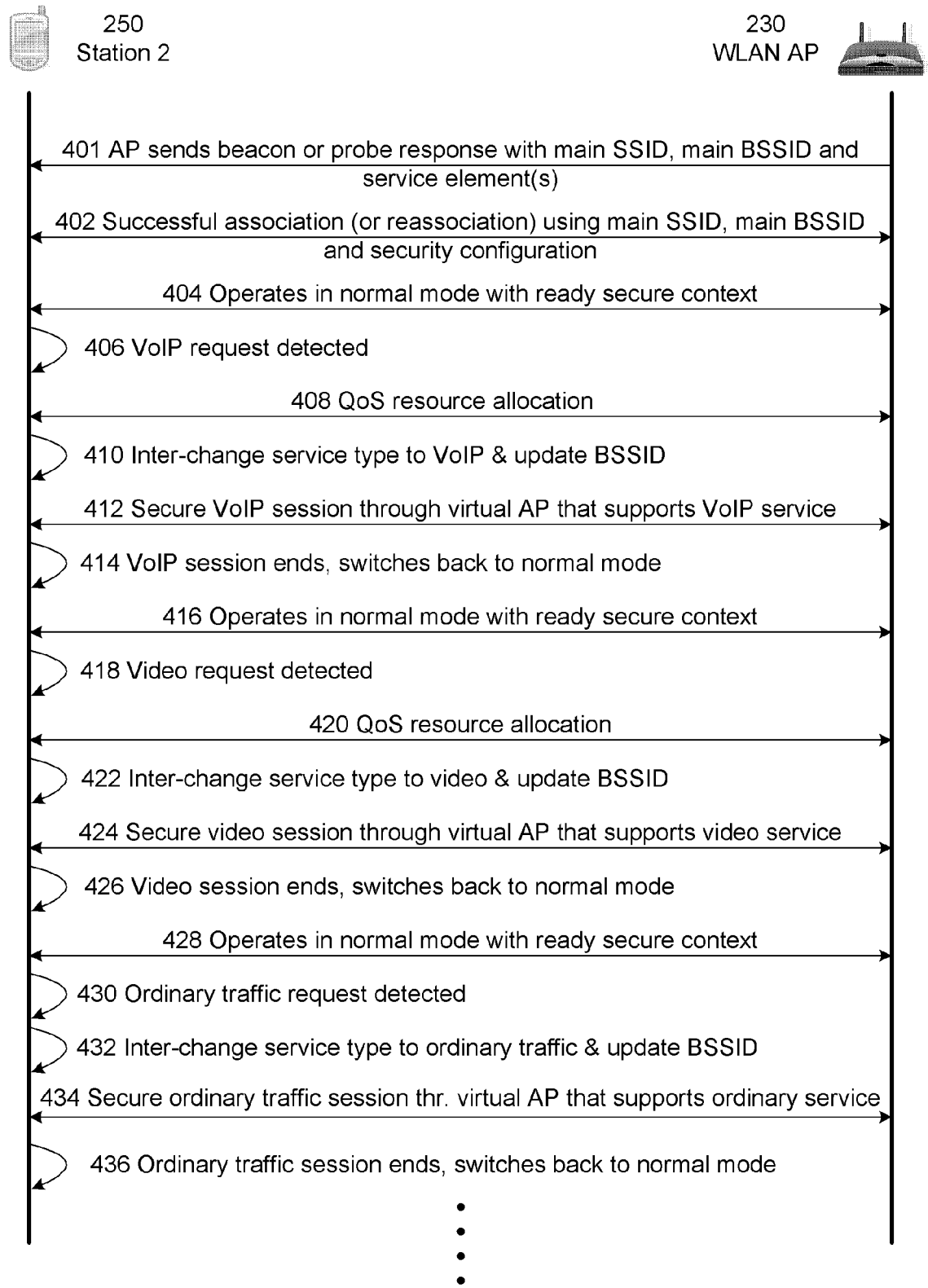
FIG. 4 illustrates a sequence of the communication events between a wireless access point and a station in accordance with one embodiment of the invention.

FIG. 4 illustrates a sequence 400 of the communication events between a wireless access point and a station in accordance with one embodiment of the invention. For clarity of illustration, FIG. 4 is discussed with reference to FIG. 2. In event 401, the WLAN AP 230 sends a beacon or probe response management frame to the station 2 250. The beacon or probe response management frame has the main SSID, main BSSID and the service element(s) of the WLAN AP 230 in one embodiment of the invention.

After receiving the beacon or probe response management frame from the WLAN AP 230, the station 2 250 reads and decodes the information in the beacon or probe response management frame. The station 2 250 detects if its desired service is supported by the WLAN AP 230 by checking the service element(s) in the beacon or probe response management frame. If the WLAN AP 230 supports the desired service of the station 2 250, the station 2 250 uses the main SSID, main BSSID to perform an association (or re-association if it has been associated with the WLAN AP 230 before) with the WLAN AP 230 in event 402. The station 2 250 also performs a security configuration or authentication protocol with the WLAN AP 230 and stores the service element(s) after the successfully association or re-association with the WLAN AP 250 in one embodiment of the invention.

In event 404, the station 2 250 operates in normal mode by maintaining connectivity with the WLAN AP 230 using the main SSID and the main BSSID of the WLAN AP 230. In one embodiment of the invention, the station 2 250 sends packets with zero or no data (NULL data packets) to maintain connectivity with the WLAN AP 230. In event 406, the station 2 250 detects a VoIP request and determines the QoS requirement of the VoIP request. In one embodiment of the invention, the station 2 250 selects one of the virtual APs in the WLAN AP 230 based on the service type of the virtual APs. For example, in one embodiment of the invention, when the station 2 250 detects a VoIP request, the station 2 250 selects VLAN2 as the VLAN2 supports VoIP service via the VoIP server 218.

In another embodiment of the invention, the station 2 250 selects one of the virtual APs in the WLAN AP 230 based on the QoS requirement of the VoIP request. One of ordinary skill in the relevant art will readily appreciate that other methods of selecting the virtual AP is possible and these other methods are applicable to the invention.

In event 408, the station 2 250 negotiates with the WLAN AP 250 and allocates one or more QoS resources in the selected virtual AP to support the QoS requirement of the VoIP request. The QoS resource includes, but is not limited to, the channel, the bandwidth, and the data rate, of the wireless communication link 255 between the WLAN AP 230 and the station 2 250. After the successful allocation of the QoS resources, the station 2 250 inter-changes or switches its service type or profile to the VoIP service and updates its BSSID for the VoIP service to the BSSID of the selected virtual AP in event 410.

The station 2 250 supports a secure VoIP session using the selected virtual AP that supports the VoIP service in event 412. The station 2 250 uses the sub-BSSID and sub-SSID element of the selected virtual AP in the MAC header of the VoIP packets in one embodiment of the invention. This allows the station 2 250 to identify and use the selected virtual AP for the VoIP service in one embodiment of the invention.

In event 414, the VoIP session ends and the station 2 250 switches back to normal mode of operation. In one embodiment of the invention, the station 2 250 monitors incoming and outgoing traffic requests and detects the type of the traffic requests in event 416 when the station 2 250 operates in normal mode. For example, in one embodiment of the invention, the WLAN AP 230 and the station 2 250 are compliant at least in part with IEEE 802.11 and the station 2 250 determines if the traffic request belongs to the four supported types of traffic that include the access category (AC) of best effort (AC_BE), AC of background (AC_BK), AC of video (AC_VI), and AC of voice (AC_VO).

In event 418, the station 2 250 detects a video request and determines the QoS requirement of the video request. In one embodiment of the invention, the station 2 250 selects VLAN1 as the VLAN1 supports video service via the video server 216. In event 420, the station 2 250 negotiates with the WLAN AP 250 and allocates one or more QoS resources in the selected virtual AP to support the QoS requirement of the video request. After the successful allocation of the QoS resources, the station 2 250 inter-changes or switches its service type or profile to the video service and updates its BBSID for the video service to the BSSID of the selected virtual AP in event 422.

The station 2 250 supports or facilitates a secure video session using the selected virtual AP that supports the video service in event 424. The station 2 250 uses the sub-BSSID and sub-SSID element of the selected virtual AP in the MAC header of the video packets in one embodiment of the invention. This allows the station 2 250 to identify and use the selected virtual AP for the video service in one embodiment of the invention.

In event 426, the video session ends and the station 2 250 switches back to normal mode of operation. The station 2 250 continues to monitor for any activity in event 428. In event 430, the station 2 250 detects an ordinary traffic request and determines the quality of service requirement of the video request. In one embodiment of the invention, the station 2 250 selects VLAN3 as the VLAN3 supports ordinary traffic via the ordinary traffic server 220. It is assumed as an illustration that no QoS requirement is needed for ordinary traffic request and therefore no allocation of QoS resources is performed.

In event 432, the station 2 250 inter-changes or switches its service type or profile to the ordinary traffic service and updates its BBSID for the ordinary traffic service to the BSSID of the selected virtual AP in event 432. The station 2 250 supports a secure ordinary traffic session using the selected virtual AP that supports the ordinary traffic service in event 434. The station 2 250 uses the sub-BSSID and sub-SSID element of the selected virtual AP in the MAC header of the ordinary traffic packets in one embodiment of the invention. This allows the station 2 250 to identify and use the selected virtual AP for the video service in one embodiment of the invention. The ordinary traffic session ends in event 436 and the station 2 250 returns back to normal mode.

Although the sequence 300 illustrates a sequential change of service profiles, this is not meant to be limiting. In another embodiment of the invention, the station 2 250 is able to execute or run concurrent service profiles with the WLAN AP 230. For example, in one embodiment of the invention, the station 2 250 supports a VoIP session concurrently with a video session. By allowing dynamic changes in service profiles using a common security control plane, it allows ease of management of the wireless network and improves the QoS of the connections.

In addition, by reducing the amount of management traffic to send multiple beacon/probe response management frames, the available usable bandwidth of the wireless network is increased and it may allow more clients or stations to be connected with the wireless network.

Figure 5:
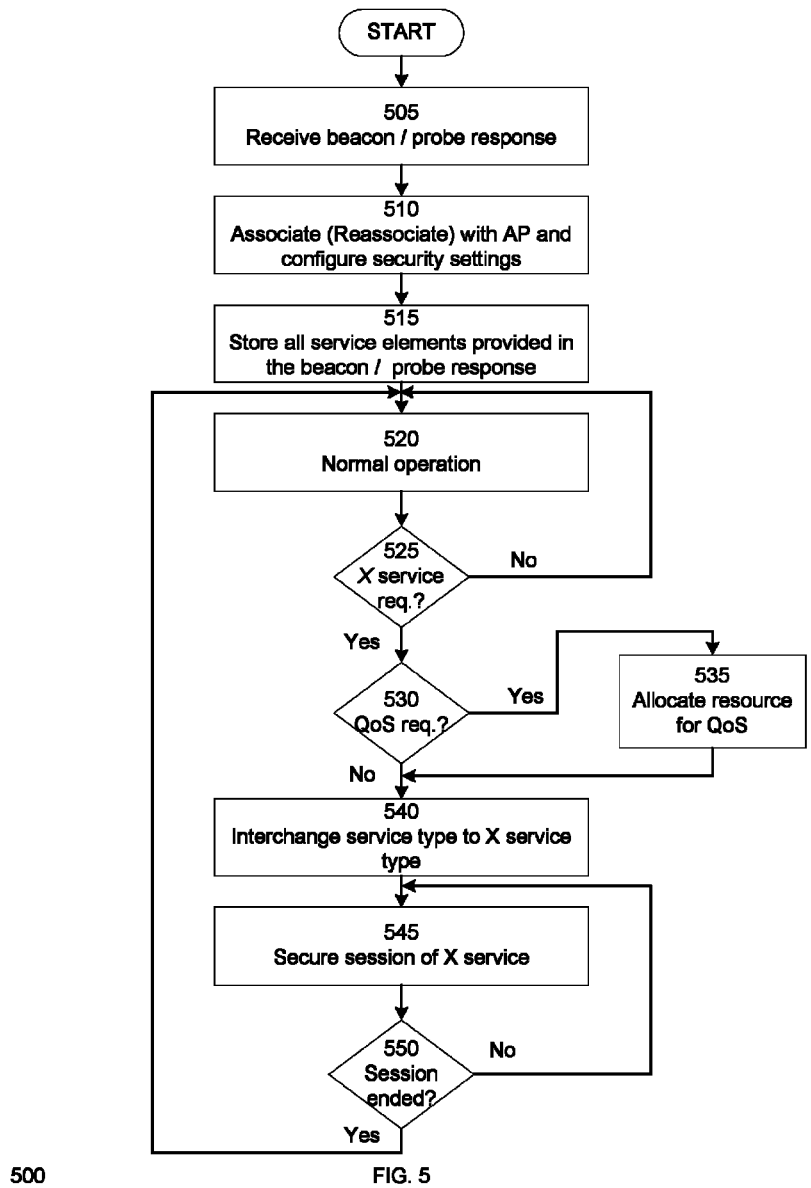
FIG. 5 illustrates a flowchart of the operations of a node in accordance with one embodiment of the invention.

FIG. 5 illustrates a flowchart 500 of the operations of a node in accordance with one embodiment of the invention. In step 505, the node receives a beacon or probe response management frame. For example, in one embodiment of the invention, the node receives the beacon management frame when an access point broadcasts a beacon during each beacon interval. The beacon management frame has information about all the virtual nodes supported by the access point and the services supported by each virtual node. In another example, the node sends out a probe request management frame to determine the available nodes or access points around it. When an access point receives the probe request management frame, the access point sends out a single probe response management frame responsive to the probe request management frame.

In step 510, after determining that the access point supports its desired service(s), the node uses the information in the beacon or probe response management frame to associate or re-associate with the access point. In addition, the node configures its security settings, authenticates itself to the access point, and establishes a secure connection with the access point. In step 515, the node stores all the service elements provided in the beacon or probe response management frame. This allows the node to be aware of the services available in the access point and the node can perform dynamic switching of service profiles while maintaining a connection or association with the access point using a uniform and persistent security control plane.

In step 520, the node operates in normal mode and checks for traffic requests. In step 525, the node checks if a X service request is received. The X service refers to any type of service supported by the access point. If no, the node continues its normal operation in step 520. If yes, the node checks if the received X service request has a QoS requirement. If yes, the node negotiates with the access point and allocates a resource(s) to meet the QoS requirement of the X service request. After allocating the resource(s), the flow 500 goes to step 540. If there is no QoS requirement of the X service request, the flow 500 goes to step 540 to interchange or switch the service type of the node to the X service request.

In step 545, the node executes a secure session of the X service. The node checks if the X session has ended in step 550. If yes, the node terminates the X service and switches back to normal operation in step 520. If the session has not ended, the flow goes back to step 545 to continue the secure session of the X service.

The methods described in flow 500 are not meant to be limiting. In another embodiment of the invention, more than one service are executed simultaneously or concurrently. Embodiments of the invention allow a node to dynamically select any type of service from the access point while maintaining a connection or association with the access point using a uniform and persistent security control plane. This allows clients to select services orthogonal to the security, and in an as-needed fashion. In addition, a wireless network operator can add and advertise services using the same security credentials with a common profile. For example, a user may have different security credentials for voice, data and video service and embodiments of the invention allow a uniform and persistent security control plane for the user to access the voice, data and video service. Wireless administrators can also dynamically provision different services on the same network.

The methods disclosed herein can be implemented in hardware, software, firmware, or any other combination thereof. For example, in one embodiment of the invention, the MAC layer logic has the capability to perform the methods and techniques disclosed herein. In another embodiment of the invention, the configuration and the beacon/probe response management frame of the access point is able to send a single frame per beacon interval to indicate or advertise its services. In yet another embodiment of the invention, the access point reduces or collates the number of beacon management frames into a smaller number. For example, in one embodiment of the invention, if an access point supports five virtual access points, the access point can create two beacon management frames from the combination of any three virtual access points and the combination of the remaining two virtual access points. One of ordinary skill in the relevant art will readily appreciate how to use other alternative methods to reduce the management traffic and these alternative methods are applicable to the invention as well.

Figure 6:
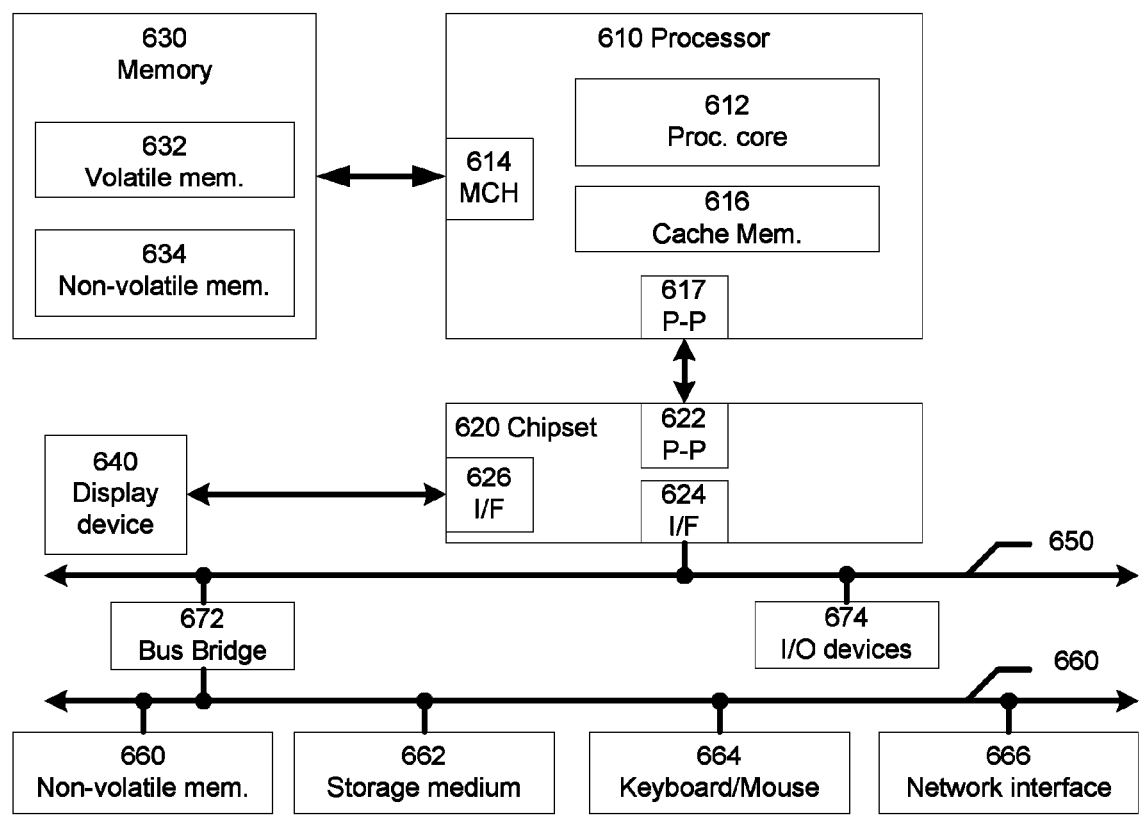
FIG. 6 illustrates a system to implement the methods disclosed herein in accordance with one embodiment of the invention.

FIG. 6 illustrates a system 600 to implement the methods disclosed herein in accordance with one embodiment of the invention. The system 600 includes, but is not limited to, a desktop computer, a laptop computer, a netbook, a notebook computer, a personal digital assistant (PDA), a server, a workstation, a cellular telephone, a mobile computing device, an Internet appliance or any other type of computing device. In another embodiment, the system 600 used to implement the methods disclosed herein may be a system on a chip (SOC) system.

The processor 610 has a processing core 612 to execute instructions of the system 600. The processing core 612 includes, but is not limited to, pre-fetch logic to fetch instructions, decode logic to decode the instructions, execution logic to execute instructions and the like. The processor 610 has a cache memory 616 to cache instructions and/or data of the system 600. In another embodiment of the invention, the cache memory 616 includes, but is not limited to, level one, level two and level three, cache memory or any other configuration of the cache memory within the processor 610.

The memory control hub (MCH) 614 performs functions that enable the processor 610 to access and communicate with a memory 630 that includes a volatile memory 632 and/or a non-volatile memory 634. The volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 634 includes, but is not limited to, NAND flash memory, phase change memory (PCM), read only memory (ROM), electrically erasable programmable read only memory (EEPROM), or any other type of non-volatile memory device.

The memory 630 stores information and instructions to be executed by the processor 610. The memory 630 may also stores temporary variables or other intermediate information while the processor 610 is executing instructions. The chipset 620 connects with the processor 610 via Point-to-Point (PtP) interfaces 617 and 622. The chipset 620 enables the processor 610 to connect to other modules in the system 600. In one embodiment of the invention, the interfaces 617 and 622 operate in accordance with a PtP communication protocol such as the Intel® QuickPath Interconnect (QPI) or the like. The chipset 620 connects to a display device 640 that includes, but is not limited to, liquid crystal display (LCD), cathode ray tube (CRT) display, or any other form of visual display device.

In addition, the chipset 620 connects to one or more buses 650 and 660 that interconnect the various modules 674, 660, 662, 664, and 666. Buses 650 and 660 may be interconnected together via a bus bridge 672 if there is a mismatch in bus speed or communication protocol. The chipset 620 couples with, but is not limited to, a non-volatile memory 660, a mass storage device(s) 662, a keyboard/mouse 664 and a network interface 666. The mass storage device 662 includes, but is not limited to, a solid state drive, a hard disk drive, an universal serial bus flash memory drive, or any other form of computer data storage medium. The network interface 666 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although the cache memory 616 is depicted as a separate block within the processor 610, the cache memory 616 can be incorporated into the processor core 612 respectively. The system 600 may include more than one processor/processing core in another embodiment of the invention.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method comprising:
receiving a management frame from an access point or from a base station by a node, wherein the management frame includes a first service set identifier SSID of the access point or the base station and a first service element that includes a second SSID, which is associated with a first virtual node of the access point or the base station, and an indication of a first service supported by the first virtual node, and the management frame further includes a second service element that includes a third SSID, which is associated with a second virtual node of the access point or the base station, and an indication of a second service supported by the second virtual node; and
establishing a uniform and persistent security control plane by the node with the access point or the base station to access services using at least in part, the first SSID of the access point or the base station and identification information of the node.

2. The method of claim 1, wherein establishing the uniform and persistent security control plane by the node with the access point or the base station comprises:
protecting communication with the access point or the base station with one or more session security keys derived from an authentication protocol using at least in part, the first SSID and the identification information of the node.

3. The method of claim 1, wherein the first SSID includes a basic service set identifier or an extended service set identifier.

4. The method of claim 1, wherein the management frame is one of a beacon management frame and a probe response management frame.

5. The method of claim 2, wherein the authentication protocol is operable in accordance with one of an Institute of Electrical and Electronics Engineers (IEEE) 802.11 Robust Security Network Association (RSNA) authentication protocol and an IEEE 802.16 RSNA authentication protocol.

6. The method of claim 1, wherein the first service element comprises a service type, a basic service set identifier (BBSID), and a channel.

7. The method of claim 1, further comprising associating or re-associating with the access point or the base station and wherein establishing the uniform and persistent security control plane with the access point or the base station comprises establishing the uniform and persistent security control plane with the access point or the base station responsive to an association or re-association with the access point or base station.

8. The method of claim 1, wherein the identification information of the node comprises at least one of a security identifier, a security credential, and a device certificate.

9. The method of claim 1, wherein the node is one of a mobile station, a subscriber station, and an user equipment.

10. The method of claim 1, further comprising:
establishing a first association with the first virtual node to utilize the first service;
and establishing a second association with the second virtual node to utilize the second service;
wherein the uniform and persistent security control plane is maintained during both the first and second associations.

11. A method comprising:
supporting a plurality of virtual access points in a multi-radio access point;
determining a service provided by each of the plurality of virtual access points;
transmitting a beacon frame or a probe response frame, wherein the beacon frame or the probe response frame includes a service element, associated with a respective service, for each of the plurality of virtual access points, and further includes a main service set identifier (SSID);
establishing a uniform and persistent security control plane with a node using the main SSID;
providing, by a first virtual access point of the plurality of virtual access points, a first service to the node;
providing, by a second virtual access point of the plurality of virtual access points, a second service to the node; and
maintaining the uniform and persistent security control plane during said providing of the first service and the second service.

12. The method of claim 11, wherein the services include a video service, an Internet service, a Voice over Internet Protocol (VoIP) service, an ordinary traffic service, video, or a voice service.

13. The method of claim 11, further comprising creating a unique basic service set identifier (BBSSID) and a unique service set identifier SSID for each virtual access point, and wherein each service element comprises the unique BSSID and the unique SSID of a respective virtual access point providing the respective service and a type of the respective service.

14. An article of manufacture comprising one or more non-transitory computer-readable media having instructions that, when executed, result in a node:
providing a plurality of virtual nodes to support a respective plurality of services; and
transmitting a management frame that includes:
a main service set identifier (SSID) to facilitate establishment of a security control plane; and
a plurality of service elements that respectively correspond with the plurality of virtual nodes, individual service elements including an SSID of a corresponding virtual node and a type of service supported by the corresponding virtual node,
establishing a security control plane with a wireless device;
establishing a first association with a first virtual node of the plurality of virtual nodes to provide the wireless device with a first service;
establishing a second association with a second virtual node of the plurality of virtual notes to provide the wireless device with a second service; and
maintaining the security control plane throughout the first and second associations.

15. An article of manufacture comprising one or more non-transitory computer-readable media having instructions that, when executed, result in a node:

receiving, from an infrastructure node, a management frame that includes a main service set identifier (SSID) and a plurality of service elements that respectively correspond with a plurality of virtual nodes provided by the infrastructure node, individual service elements including an SSID of a corresponding virtual node and a type of service supported by the corresponding virtual node;

establishing a security control plane using the main SSID;

establishing a first association with a first virtual node of the plurality of virtual nodes to utilize a first service;

establishing a second association with a second virtual node of the plurality of virtual nodes to utilize the second service; and maintaining the security control plane throughout the first and second associations.

* * * * *

UNITED STATES PATENT AND TRADEMARK OFFICE
CERTIFICATE OF CORRECTION

PATENT NO. : 8,438,389 B2
APPLICATION NO. : 12/542244
DATED : May 7, 2013
INVENTOR(S) : Zongming Sinbada Yao et al.

Page 1 of 1

It is certified that error appears in the above-identified patent and that said Letters Patent is hereby corrected as shown below:

In The Claims

Column 12

Line 61, "...virtual notes..." should read --...virtual nodes...--.

Signed and Sealed this
Twelfth Day of May, 2015

Michelle K. Lee
*Director of the United States Patent and Trademark Office*